(12) United States Patent
Abbott et al.

(10) Patent No.: US 8,209,171 B2
(45) Date of Patent: Jun. 26, 2012

(54) METHODS AND APPARATUS RELATING TO SEARCHING OF SPOKEN AUDIO DATA

(75) Inventors: Martin G Abbott, Malvern (GB); Keith M Ponting, Malvern (GB)

(73) Assignee: Aurix Limited, Worcestershire (GB)

( * ) Notice: Subject to any disclaimer, the term of this patent is extended or adjusted under 35 U.S.C. 154(b) by 955 days.

(21) Appl. No.: 12/222,381

(22) Filed: Aug. 7, 2008

(65) Prior Publication Data

US 2009/0043581 A1 Feb. 12, 2009

Related U.S. Application Data

(60) Provisional application No. 60/963,678, filed on Aug. 7, 2007.

(51) Int. Cl.
*G10L 15/00* (2006.01)
(52) U.S. Cl. ...... 704/235; 704/251; 704/255; 369/27.01
(58) Field of Classification Search .................. 704/235, 704/251, 255; 369/27.01
See application file for complete search history.

(56) References Cited

U.S. PATENT DOCUMENTS

| | | | | |
|---|---|---|---|---|
| 6,185,527 | B1 * | 2/2001 | Petkovic et al. | 704/231 |
| 6,260,011 | B1 * | 7/2001 | Heckerman et al. | 704/235 |
| 6,408,270 | B1 * | 6/2002 | Garber | 704/251 |
| 6,697,796 | B2 * | 2/2004 | Kermani | 379/88.14 |
| 7,039,585 | B2 * | 5/2006 | Wilmot et al. | 704/235 |
| 7,725,318 | B2 * | 5/2010 | Gavalda et al. | 704/251 |
| 7,809,568 | B2 * | 10/2010 | Acero et al. | 704/257 |
| 7,912,699 | B1 * | 3/2011 | Saraclar et al. | 704/9 |
| 2004/0210443 | A1 * | 10/2004 | Kuhn et al. | 704/276 |
| 2006/0206324 | A1 * | 9/2006 | Skilling et al. | 704/231 |
| 2008/0082334 | A1 | 4/2008 | Watson | |

(Continued)

FOREIGN PATENT DOCUMENTS

EP 1 688 915 8/2006

(Continued)

OTHER PUBLICATIONS

UK Search Report dated Dec. 12, 2008 for GB 0814384.4.

(Continued)

*Primary Examiner* — Daniel D Abebe
(74) *Attorney, Agent, or Firm* — Maldjian Law Group LLC; John P. Maldjian, Esq.; Alexander D. Walter, Esq.

(57) ABSTRACT

This invention relates to a method of searching spoken audio data for one or more search terms comprising performing a phonetic search of the audio data to identify likely matches to a search term and producing textual data corresponding to a portion of the spoken audio data including a likely match. An embodiment of the method comprises the steps of taking phonetic index data corresponding to the spoken audio data, searching the phonetic index data for likely matches to the search term, wherein when a likely match is detected a portion of the spoken audio data or phonetic index data is selected which includes the likely match and said selected portion of the spoken audio data or phonetic index data is processed using a large vocabulary speech recognizer. The large vocabulary speech recognizer may derive textual data which can be used for further processing or may be used to present a transcript to a user. The present invention therefore combines the benefit of phonetic searching of audio data with the advantages of large vocabulary speech recognition.

22 Claims, 2 Drawing Sheets

U.S. PATENT DOCUMENTS

2008/0162125 A1* 7/2008 Ma et al. .................. 704/222
2008/0270138 A1* 10/2008 Knight et al. ............... 704/260

FOREIGN PATENT DOCUMENTS

GB    2 355 837    5/2001
WO    WO 98/34217    8/1998

OTHER PUBLICATIONS

GB Search Report of GB 0715369.5, dated Nov. 26, 2007.
EP Search Report of EP 05 00 2472, filed Jun. 28, 2005.
U.S. Appl. No. 11/347,313, Adrian Ian Skilling et al., filed Feb. 6, 2006, (EP 05002472.8 and U.S. Appl. No. 60/650,140).
Foote et al., "Unconstrained keyword spotting using phone lattices with application to spoken document retrieval", Computer Speech and Language, vol. 11, No. 3, Jul. 1997, pp. 207-224, XP004418786.
Seide et al., "Vocabulary-independent search in spontaneous speech", 2004 IEEE International Conference on Acoustics, Speech, and Signal Processing, vol. 1, May 17, 2004, pp. 253-256, XP002333530.
Gelin et al., "Keyword spotting for multimedia document indexing", Multimedia storage and archiving systems II, vol. 3229, Nov. 3, 1997, pp. 366-377, XP002333531.
James et al., "A fast lattice-based approach to vocabulary independent wordspotting", Database accession No. 4916146.
Kadambe et al., "Language identification with phonological and lexical models", 1995 International Conference on Acoustics, Speech, and Signal Processing, ICASSP-95, vol. 5, May 9, 1995, pp. 3507-3510, XP010152103.
Politis et al., "An audio signatures indexing scheme for dynamic content multimedia databases", $10^{th}$ Mediterranean Electrotechnical Conference, 2000, vol. 2, May 29, 2000, pp. 725-728, XP010517893.
Clements et al., "Phonetic Searching of Digital Audio", International Journal of Speech Technology, Aug. 4, 2002, XP002977606.
Dharanipragada et al., "A multistage algorithm for spotting new words in speech", IEEE Transactions on Speech and Audio Processing IEEE, vol. 10, No. 8, Nov. 2002, pp. 542-550, XP002333533.
Tucker et al., "Speech-As-Data Technologies for Personal Information Devices", HPL-2002-42.
Moreau et al., "Phone-based Spoken Document Retrieval in Conformance with the MPEG-7 Standard", AES $25^{th}$ International Conference, Jun. 17-19, 2004.

* cited by examiner

METHODS AND APPARATUS RELATING TO SEARCHING OF SPOKEN AUDIO DATA

This application claims the benefit of U.S. Provisional Application No. 60/963,678, filed 7 Aug. 2007, the entire contents of each of which are hereby incorporated by reference.

This invention relates to methods and apparatus for searching audio and processed audio data for spoken words and phrases.

There is a growing need to search audio and video data to identify words and phrases in ways that are analogous to information retrieval techniques that are today commonly applied to text. Example applications include spoken document retrieval, audio data mining, and real-time monitoring of audio streams. Speech recognition technology has been applied to the searching of audio information, and various approaches have been proposed.

One approach, termed word spotting, processes the audio data to determine whether or not a particular search term occurs in the audio. Whilst this approach allows searching for any search term, it requires reprocessing of the entire audio corpus each time a search is performed. This is computationally expensive, and can result in long search times.

An alternative approach is to process the audio data file once and create a metadata file which can be linked to the audio data. This metadata can then be searched quickly to locate a desired search term.

The usual approach for producing metadata is to create a text transcript of the audio file using a large vocabulary speech recogniser, such as a large vocabulary continuous speech recogniser or LVCSR. The skilled person will understand that for processing any finite portion of audio data it is not necessary for the speech recognition system to be truly "continuous" and large vocabulary connected speech recognition systems can handle fluent speech but cannot necessarily handle speech of unlimited or unknown duration. Typically connected speech recognisers are designed to operate in file-to-file mode while continuous speech recognisers are also capable of operating in streaming modes and typically capable of operating with spontaneous speech, where the speaker frequently talks in a continuous manner with no significant gaps between words. The skilled person will further appreciate that a large vocabulary isolated speech recognition systems are known and can be used in some applications. In the context of this application, the term large vocabulary speech recogniser shall be taken to mean any speech recognition system which acts to identify possible words in spoken audio using a database of known words, and for the avoidance of doubt includes, without limitation, large vocabulary continuous speech recognisers and large vocabulary connected speech recognisers.

Whilst very fast searching is possible with the large vocabulary speech recogniser approach—the metadata file representing a textual transcript can be searched using standard text based searching techniques, as used, for example, in a word processor or text-based search engine—there are limitations with this approach. For instance the large vocabulary speech recogniser transcription error rates are high, especially on conversational speech. Transcription word error rates typically range 20-70% depending on the quality of the speech data and the characteristics of the large vocabulary speech recogniser. Further, large vocabulary speech recognisers are inherently limited by their vocabulary database in that they can only identify sound patterns for words with which they have previously been programmed. Therefore when audio data is processed the resulting metadata transcript file can only contain words which the recogniser had knowledge of at the time of processing. Thus where an audio data file contains a spoken word that the recogniser has no knowledge of (i.e. is not in the large vocabulary speech recogniser's dictionary), for instance the name of a new product or company or the name of a person, the metadata transcript will not contain that word and again a search for that term can never generate an exact match or "hit". Such words are often described as "out of vocabulary" (OOV). Because large vocabulary speech recogniser systems rely on word sequence constraints, each occurrence of an OOV word leads, on average, to more than one word error in the transcript.

A more recent approach has retained phonetic information when creating a metadata file for searching—see for example K. Ng and V. Zue, "Phonetic Recognition for Spoken Document Retrieval," Proceedings of IEEE International Conference on Acoustics, Speech and Signal Processing, Seattle, USA, pp. 325-328, 1998. In this approach the speech recogniser does not attempt to identify words in the audio file but instead represents the phonetic content of the audio file. The metadata file then consists of a representation of the identified phones in the audio file.

This approach offers more flexibility in that, in effect, the metadata file represents the identified sounds in the speech and the speech recogniser does not make any hard decisions about what words these sounds correspond to in creating the metadata. The concept of a word is only realised at search time, when an input search term (e.g. a text string representing one or more words) is converted into a phone sequence and a search performed on the metadata file to identify instances of that phone sequence. This approach does require more processing during searching than the large vocabulary speech recogniser-based transcription approach but can reduce "recall errors"—those errors which result when the large vocabulary speech recogniser system confuses a phonetically similar sequence with the actual words spoken and is therefore unable to retrieve that spoken sequence of words. Also, the issue of OOV errors does not arise, as the vocabulary of such phonetic systems is not limited by a dictionary of known words that is used at pre-processing time and is only limited by the database of phones which can be identified—which is generally unchanging in a given language. Searches for words recently added to the dictionary can be carried out without the need to re-process the audio. The search can identify all instances of similar sound patterns allowing the user to quickly verify whether the identified speech is of relevance.

One variation of this approach creates an index file which comprises a phonetic lattice representing multiple possible phone matches. "Unconstrained keyword spotting using phone lattices with application to spoken document retrieval" J. T. Foote et el. Computer Speech and Language (1997), 11, 207-224 describes a phone lattice based approach to keyword spotting and suggests that there may be value in combining a phone lattice approach with a LVCSR to spot out of vocabulary words.

US published patent application US2006/0206324 and European patent application EP1688915 describe an implementation of a phonetic based indexing and/or searching technique which makes no initial decisions when processing the audio and allows for rapid searches to be performed at search time.

The skilled person will be well aware that a sub-word speech recognition system is not restricted to using units that correspond to phonemes in the target language. Any finite alphabet of symbols which may be composed to form models of words could equally well be used, i.e. any set of sub-word units including, without limitation, multiple syllable units or sub-phoneme units—see for example J. J.-X. Wu, L. Deng, J. Chan, "Modeling context-dependent phonetic units in a continuous speech recognition system for Mandarin Chinese", in: Proc. International Conference on Spoken Language Processing, vol. 4, 1996. Therefore as used throughout this specification the term "phone" shall be taken to mean a sound or set of sounds which form part of a spoken language and shall for the avoidance of doubt be taken to include, without limitation, multiple syllable sub-word units, phonemes and sub-phoneme units as well as individual phonemes. The term "phonetic" shall be interpreted accordingly as meaning relating to phones. Thus references herein to a phonetic recogniser include any systems which model spoken language as being composed from a finite set of elements. In extreme cases, that alphabet of symbols, i.e. phones, may include some whole word or even phrase models.

The present invention is directed towards improved methods and apparatus for searching of audio data.

Thus according to the present invention there is provided a method of searching spoken audio data for a search term comprising the steps of taking phonetic index data corresponding to the spoken audio data, searching the phonetic index data for likely matches to the search term, wherein when a likely match is detected a portion of the spoken audio data or phonetic index data is selected which includes the likely match and said selected portion of the spoken audio data or phonetic index data is processed using a large vocabulary speech recogniser.

The present invention therefore performs an initial phonetic search to identify likely matches, so called hits, to the search term. Once a likely match has been identified a corresponding portion of the spoken audio data or the phonetic index data which includes said possible match is then processed using a large vocabulary speech recogniser. The present invention therefore incorporates the advantages of phonetic searching and large vocabulary systems as will be described.

The phonetic index data is, as the skilled person will readily understand, searchable data which represents the likely phonetic content of the spoken audio to be searched (which may be all or part of a spoken audio data file or continuous stream of spoken audio). It could, for example, be a simple format matrix file comprising a score for each of a set of reference phones, or the scores for the best matching phones, for each frame time of the spoken audio as described in US2006/0206324, (the contents of which is incorporated herein by reference) or could be a phone lattice as described in the "Unconstrained keyword spotting using phone lattices with application to spoken document retrieval" J. T. Foote et el. Computer Speech and Language (1997), 11, 207-224. However any representation of the phonetic content of the speech could constitute the phonetic index data. The phonetic index data could have been prepared at some earlier point in time and stored as data associated with the spoken audio file, i.e. metadata. For instance the phonetic index data could have been created when the audio file was recorded or when it was added to an archive. Alternatively an initial step in the searching process could be to process the audio data to create the phonetic index data. The method may therefore include a step of processing the spoken audio to create phonetic index data. If phonetic index data is created it could usefully be stored for future searching—thus each piece of audio may only need processing once to create phonetic index data. In some applications though there may be a reason why the phonetic index data is not stored and the phonetic index data may be created only temporarily. The term "phonetic index data" shall therefore be taken to include both stored files as well as temporary data stores that may only be created and used as part of the phonetic search. It shall also be taken to include "in-memory" representations such as a stream of phonetic information passed from one process to another and multiple individual files each corresponding to some section of audio in a collection of audio material.

The skilled person will be well aware of how to create phonetic index data for spoken audio files. For instance US2006/0206324, the contents of which are incorporated herein by reference, teaches using conventional speech recogniser techniques such as using hidden Markov models (HMMs) to determine the likelihood scores of phones in the audio. HMMs representing each phone are developed, each HMM containing features that relate to the spectral content of the sound associated with that phone. A single phone may be represented by more than one HMM, in order to model effects due to phone context and/or to model known sequences of sounds that occur for a single phone. Durational characteristics of the phone are may also be modelled. The phonetic recogniser typically analyses short sections of audio, usually called frames (typically at a rate of 100 frames per second), and calculates the required spectral features for the audio and compares the values for these features with the values in each of the HMMs. Likelihoods are calculated for each HMM. US2006/0206324 teaches that it is convenient to store distances representing the differences between the spectral features of the audio and the features in the models. Distance scores represent how similar/dissimilar a particular portion of audio is to an HMM. The distance is a single value calculated using all of the model features that typically relate to the frequency content of the signal and these distances are used to form a score for each of the candidate phones which are stored or further processed as the phonetic index data. If a single phone is represented by multiple HMMs (for example to model context effects or sequences of sounds), scores are produced for all of the HMMs. Alternatively a phone lattice could be constructed and stored as the phonetic index data as described in "Unconstrained keyword spotting using phone lattices with application to spoken document retrieval" J. T. Foote et el. Computer Speech and Language (1997), 11, 207-224.

As mentioned the method of the present invention takes such phonetic index data and searches it for likely matches to the search term. The type of search performed will depend on the exact nature of the phonetic index data. For instance as described in US2006/0206324 where the phonetic index data comprises the distance score for each possible phone for each frame the search can be easily implemented using a dynamic programming search. Where the phonetic index data comprises a phone lattice a lattice search is performed as will be well understood by one skilled in the art.

The search performed will also depend on the application. For instance the search may involve searching for any instances of a search term comprising a single word or a series of consecutive words forming a phrase. Additionally or alternatively the search could look for any instances of all or any of a number of search words and/or phrases. The search could be expanded to cover synonyms to words appearing in the search and in some applications different weightings may be given to different words to be searched, for instance to improve an indication of relevance. The skilled person will be well aware of information retrieval techniques which use such multiple search terms and weighted combinations of search terms in order to classify material, as described, for example, in S. E. Robertson, S. Walker, "Okapi/keenbow at trec-8", in: NIST Special Publication 500-246: The Eighth Text REtrieval Conference, National Institute for Standards and Technology, 1999. http://trec.nist.gov/pubs/trec8/t8_proceedings.html. The step of searching the phonetic index data for likely matches to the search term may therefore comprise searching for one or more search terms as part of a search query. The term "search query" as used herein shall be taken to include all combinations of multiple search terms (words or phrases), including without limitation search for terms occurring within some time interval of each other, weighted combinations of scores for multiple search terms and search for the presence of some terms combined with the absence of others.

The phonetic search will identify any likely matches to the search term and is vocabulary independent. Depending on the nature of the search performed one or more portions of the spoken audio data which represent likely matches may be identified, ranked in order of confidence and/or with an indication of confidence in the match. Prior to the present invention in order to confirm the relevance of the result of a phonetic search the user would have to locate the corresponding portion of the spoken audio data and listen to it. Conveniently the results list of such a conventional phonetic search would include, where possible, a link to the relevant portion of the spoken audio data to aid retrieval and playback by the user for the purposes of reviewing the portion of the spoken audio data to determine if it does relate to what they were searching for. To enable a user to make sense of the identified audio segment playback of the audio data beneficially included some speech immediately before and after the likely match to the search term. This allows the user to not only confirm whether or not the search term is indeed present in the audio but also determine the context in which the term was used so as to determine the relevance of the audio to their search.

The duration of the portion of the audio to be played back would usually therefore be preset to include a certain amount of time before and after the likely match, for instance a few seconds of audio before and after the likely match. Playing a longer segment, such as say 10 seconds both before and after the possible match to the search term, will generally afford a user a better understanding of the context in which the term is used (up to a certain limit). However obviously listening to a longer audio segment will increase the overall time taken to listen to all the results to identify audio segments of interest. This is especially true if a search query involves looking for several different words spoken within a certain short period—the equivalent of searching textual documents for words appearing near each other. Where such a search is performed the portion of the audio data identified for playback may comprise a continuous portion of the audio data starting a few seconds before the first identified search word and continuing to a few seconds after the last instance of a search word. This can represent a relatively long duration audio portion which the user needs to listen to in order to determine if the search result is relevant. In extreme cases the selected portion may comprise the whole of the recording matching the search query.

The present invention therefore takes the audio segment or phonetic index data corresponding to the search term, or if applicable the portion of the spoken audio data or phonetic index data which corresponds to the overall search query, and processes it using a large vocabulary speech recogniser As the skilled person will understand, a large vocabulary speech recogniser can not only give its own indication of confidence in a likely match but can produce a textual transcript or other information relating to the likely textual content of the selected portion of the spoken audio data.

In one embodiment therefore the output of the large vocabulary speech recogniser comprises an indication of confidence in the likely match. This could be provided by simply using the confidence level in the match to the search term as determined by the large vocabulary speech recogniser. Alternatively the confidence level determined by the large vocabulary speech recogniser could be combined with the confidence level determined during the phonetic search to provide an overall confidence level. Also as will be described later the output of the large vocabulary speech recogniser could be further processed to refine the confidence level.

The large vocabulary system may be completely constrained by the likely match—in other words the grammar used by the large vocabulary system may be modified so that recognition is constrained to pass through the node or nodes corresponding to the word or words in the likely match during a time interval derived from the beginning and end of that match.

That constraint may also be a "soft" constraint, in that the initial confidence level determined by the phonetic search could be used to modify the processing by the large vocabulary speech recogniser. The grammar probabilities used by the large vocabulary system may for instance be modified to reflect the assumption that the likely match did occur at or around the time position of likely match indicated by the phonetic search. The degree of modification of the probabilities used by the large vocabulary system may be based on the confidence score returned in the phonetic match.

Additionally or alternatively the output of the large vocabulary speech recogniser could comprise an indication of likely possible words corresponding to the selected portion of the spoken audio data or phonetic index data. This could be in the form of a textual transcript as mentioned, possibly with alternative possible transcriptions, or could be a word lattice, a word confusion matrix, an inverted word matrix etc. The skilled person will be aware that a large vocabulary speech recogniser can be configured to provide a variety of outputs indicative of the content of the audio data and can choose an appropriate output depending on the particular application.

The phonetic index data, being a representation of the phonetic content of the spoken audio data can be processed by the large vocabulary speech recogniser system for instance to produce a transcript. The phonetic index data can be used directly by the large vocabulary speech recogniser system to identify the words that the sequence of phones corresponds to, especially where the phonetic index data comprises the scores from phone models. Using the phonetic index data can avoid the need for the large vocabulary speech recogniser to use the spoken audio data which may be useful in some applications where the spoken audio data is difficult to retrieve. Also using the phonetic index data removes the need to process the spoken audio data itself using a series of models of speech sounds as this step has already been completed in creating the phonetic index data. Hence using the phonetic index data as the input to the large vocabulary speech recogniser could result in faster transcription than using the spoken audio data itself. However as the amount of spoken audio data processed in the present method is relatively low the speed improvement may be relatively modest.

It may therefore be advantageous to process the spoken audio data itself using the large vocabulary speech recogniser. This allows the models employed to model the speech sounds to be tailored to the particular application. Large vocabulary speech recognisers often use sophisticated context-dependent phone models known as triphones or quinphones. This improves accuracy of the large vocabulary speech recogniser and reduces word error rates as compared to using single phone models. However for the phonetic index data and consequent phonetic search it may be preferable to use a smaller number of models and/or to model smaller sound units. Thus using the large vocabulary speech recogniser on the spoken audio data rather than the phonetic index file can allow optimised techniques for large vocabulary speech recogniser systems to be employed.

The method of the present invention can therefore comprise the step of displaying a textual transcript of the portion of the spoken audio corresponding to the likely match to the search term. This textual transcript can be displayed to a user as a results list or in addition to or as part of a results list as described above. For instance the relevant portion of the spoken audio can be identified, possibly along with an indication of confidence in the match and the textual transcript of the portion of the spoken audio. Typically a user can read the transcript of the portion of the spoken audio and therefore assess the relevance of that part of the spoken audio to their search very quickly, much quicker than having to listen to each audio portion. This reduces the time it can take a user to review the search results and means the user can more easily and quickly assess the relevance of the likely matches to the search term and determine which, if any, audio segments they wish to listen to. Similar benefits could be realized for automated post processing and analysis and the method may involve the step of further processing or analysing the textual transcript in accordance with some criteria or rules, such as business rules. For instance text based information retrieval techniques or automated analysis techniques could be applied. By so limiting the audio data and corresponding transcript to the segment(s) of interest, automated analysis techniques may operate more efficiently and accurately.

As described above, in order to usefully give information about the context of the relevant portion of the spoken audio, the portion of the spoken audio which includes the likely match also include periods of any spoken audio immediately before and after the likely match. In other words the location of the likely match to the search term is located in the spoken audio and a time window located about the likely match. All spoken audio within that time window is then processed using the large vocabulary speech recogniser. The duration of the portion of the spoken audio could be fixed in advance based on a predefined duration, for instance five seconds or so of spoken audio centred on the likely match to the search term. Ideally the start and end of the window are located in periods of silence which can be identified as being between words. Alternatively the duration of the time window could be determined by the speech recogniser in response to the number of hits to display or how different the words in the transcription are. Alternatively the recogniser could be adapted to output so many words, say ten or so, immediately before or after the portion which matches the search term in which case the portion of spoken audio data is selected to contain a certain number of words. Once a likely match is identified the audio corresponding to a few seconds before and after the likely match could be processed to produce a textual transcription. This transcription could then be limited to so many words before and after the search term. If the initial window did not include the requisite number of words the start and/or end of the window could be moved further from the likely match as appropriate until the transcription did include the required number of words. In another arrangement the large vocabulary speech recogniser could process the speech forward from the end of the likely match to the end of the window, or until the requisite number of words have been identified and also process the audio backwards from the start of the likely match to the start of the time window or appropriate number of words have been transcribed.

Where there are more than one instances of a likely match to a search term occurring within a short, set period of time, or where the search is a search query for matches to a number of search terms and a number of likely matches to different search terms occur, a single continuous portion of the audio could be selected which includes more than one likely match—the portion of the spoken audio data processed by the large vocabulary speech recogniser could be selected to include more than one likely match where the likely matches occur within the set period of time. The overall duration of the portion of the audio data may be slightly longer than the window surrounding a single instance of a match but it could be presented to the user or passed on for further automated processing as a single hit.

In general there is a trade off, in considering the amount of data included in the portion of the audio processed by the large vocabulary speech recogniser, between providing sufficient information so as to enable the user to determine context and providing too much data for a user to easily assimilate. However sensible contextual judgements can be made using a relatively limited number of words which can be quickly visually scanned. The amount of data processed by the large vocabulary speech recogniser will also depend on the particular application. For instance where the spoken audio data to be searched comprises a large number of separate audio recordings, such as a database of recorded telephone calls, it may be wished to use the phonetic search to identify individual recordings of possible interest. Once identified the large vocabulary speech recogniser may transcribe the whole of a recording, such as a particular telephone call, for presentation or further analysis.

The present invention therefore utilises the advantages of ease of presentation or analysis of transcribed spoken audio which is inherent in large vocabulary speech recognisers together with the good searching performance of a phonetic based system. As the large vocabulary speech recogniser only processes a small portion of the spoken audio at search time the processing time and overhead for using a large vocabulary speech recogniser is not significant. Further the dictionary used by the large vocabulary speech recogniser can include current terminology at the time of search and the vocabulary of the large vocabulary speech recogniser can be adapted to include any words in the search term which are not already present in the vocabulary. In other words even if the search term(s) do not ordinarily appear in the dictionary entering OOV search term(s) can force the term(s) to be included in the dictionary for the duration of the search.

It is of course possible that the large vocabulary speech recogniser makes one or more transcription errors but as it is not this system which is being used to identify instances of the search term such a transcription error does not lead to possibly relevant hits being missed. Any transcription error would reduce intelligibility of the transcript but this would most likely be apparent to a user who could still choose to listen to the relevant part of the spoken audio.

In an embodiment of the invention further processing is performed on the output of the large vocabulary speech recogniser, i.e. the large vocabulary speech recogniser results may be used in another search iteration to improve performance or for automated processing. In the same manner as described above the initial search is a phonetic search conducted by searching a phonetic index file to identify likely matches. The phonetic search identifies correct matches to the search term but may also identify similar sounding words or phrases and therefore the hit list may include some false positives. The results of the search of the phonetic index data are therefore taken and a portion of the audio processed by a large vocabulary speech recogniser for each likely match One benefit of this approach is that the large vocabulary speech recogniser system will employ a language model that is likely to remove some of the false positives from the phonetic search. This is because the phonetic search process does not employ a language model, unlike the large vocabulary speech recogniser system, and is more likely to match similar sounding but erroneous phoneme sequences that would be filtered out by the language model in the large vocabulary speech recogniser system. Such a language model typically considers the hypothesised preceding word context of the likely match and penalises those occurrences where that preceding context is less frequently observed or never observed in conjunction with the search term.

The output of the large vocabulary speech recogniser may then be searched for the search term to derive a confidence level for each possible match. Using a phonetic search as a first search ensures that likely matches are identified even in the case of out of vocabulary words without needing to process all of the spoken audio with the large vocabulary speech recogniser. Only the areas of interest in the spoken audio, as identified from the phonetic search, are then searched using the large vocabulary speech recogniser to remove false positives and provide a more refined relevance list.

As mentioned previously the output of the large vocabulary speech recogniser at this stage need not be a finalised transcript of the audio but could comprise an indication of the likely possible words. That is, the large vocabulary speech recogniser could, for example, produce not only the best estimate of the words that the spoken audio corresponds to but also it could provide other likely alternatives. For instance one step to take would be to produce a word lattice index file that could be searched for the search term as mentioned in "AT&T at TREC-7 SDR Track", A. Singhal, J. Choi, D. Hindle, D. D. Lewis, F. Pereira, Proceedings of the TREC Conference, Washington D.C., 1998. Of course when the searches are completed it may still be beneficial to form a single transcript and display this to the user as described above.

The present invention may therefore use a large vocabulary speech recogniser engine to process a sample of available spoken audio material for further automated or human analysis, with the selection of material for processing using the large vocabulary speech recogniser being performed by a phonetic search engine. For instance a phonetic search could be applied to characterize an inquiry by topic, intent, or specific product references etc. Phonetic searching provides a better sample than can be obtained by random sampling of the entire available audio. In this embodiment the phonetic search process selects audio segments that are most worth the expense of large vocabulary speech recogniser processing. As an exemplary application the invention may be employed within a customer service call centre. Thus the spoken audio data may comprise a body of recorded phone conversations and the search may be performed to identify particular conversations or types of conversation. This embodiment of the invention differs in that the phonetic search sampling is tuned with reference to the processing capacity of the large vocabulary speech recogniser system.

Searching using this two stage procedure, first a phonetic search to identify candidate matches followed by an large vocabulary speech recogniser approach based around said candidate matches, offers an improved search over simply doing a phonetic search alone. Further as the large vocabulary speech recogniser identifies the words that the spoken audio corresponds to it is possible to apply information retrieval techniques at the large vocabulary speech recogniser stage as well as at the phonetic stage. For instance the occurrence of synonyms or related words to the search term can easily be identified and used to identify relevance. Topic spotting techniques or other contextual filters could be applied as appropriate.

It has been proposed that large vocabulary speech recognisers could use a form of phonetic matching to deal with out-of-vocabulary words (OOV). The output of such a large vocabulary speech recogniser may therefore comprise a word transcript or word lattice for in vocabulary words and some kind of phonetic match or lattice for OOV words. Typically the transition from in vocabulary words to a phonetic match and back to in vocabulary words will result in some extraneous phonetic data being present. The idea of further processing the output of the large vocabulary speech recogniser according to the present invention is applicable to such speech recognisers. The further processing can effectively tidy up the output to produce coherent text before and after each OOV phonetic match. Processing spoken audio using a large vocabulary speech recogniser may therefore involve use of a grammar having a phonetic sub-grammar for matching OOV words and involve incorporating the phonetic sub-grammar in the node or nodes corresponding to words in the likely match.

The method of the present invention may conveniently be implemented using a computer and can be performed satisfactorily using standard personal computers. Therefore in another aspect of the invention there is provided a computer program for implementing the method of searching spoken audio data as described above. The invention also extends to a computer programmed to carry out the method of searching and to a computer program on a machine readable storage medium.

In another aspect the present invention provides an apparatus for searching spoken audio data for a search term comprising a phonetic search engine for searching a phonetic index file corresponding to the spoken audio data for likely matches to the search term and a large vocabulary speech recogniser for processing a portion of the spoken audio which includes the likely match. The apparatus may conveniently include a phonetic recogniser for creating a phonetic index file from the spoken audio data. Thus this aspect of the present invention effectively provides an apparatus for performing the method of the first aspect of the invention. As such all the advantages of the first aspect of the invention apply to the apparatus and all the embodiments thereof can be implemented in the apparatus.

In general the present invention relates a method of searching spoken audio data for one or more search terms comprising performing a phonetic search of the audio data to identify likely matches to a search term and producing textual data corresponding to a portion of the spoken audio data including a likely match. The textual data may be any data relating to possible words that the relevant portion of spoken audio data may corresponds to. The textual data could simply comprise a measure of confidence in one or more particular words, for instance the search term, or could be an indication of the possible textual content of the portion of the spoken audio. In particular the textual data may comprise textual transcript data. Such textual transcript data may not be an actual textual transcription that is ever displayed or printed but may be used in further processing and it may comprises a plurality of different transcription alternatives, i.e. word lattice type data. Where a user is provided with results however the ability to display a transcript or a portion of a transcript will aid in assessing the results. As described above the phonetic search conveniently comprises searching phonetic index data corresponding to the spoken audio data. The method may involve performing a further search on the textual data, either for the same search terms to improve the accuracy and eliminate false alarms, or alternatively or additionally using one or more new search terms.

The present invention also relates to a method of processing spoken audio data comprising the steps of using a phonetic search engine to identify possible matches to at least one search term and using a large vocabulary speech engine on a portion of the spoken audio data including a likely match. The large vocabulary speech engine may be adapted to produce textual data corresponding to the relevant portion of the spoken audio data. The textual data may be used for automated analysis of the spoken audio data.

An embodiment of the present invention also relates to apparatus for searching spoken audio data for at least one search term comprising a phonetic search means for performing a phonetic search for likely matches to the or each search term and a transcription means for producing textual data corresponding to a portion of the spoken audio data including a likely match. The apparatus may further comprising a textual search means for searching the textual data for said search terms and/or for at least one additional search term. The apparatus may also comprise an analyser for analysing the textual data in accordance with business rules.

In general the invention relates to what may be considered to be a hybrid audio search engine. In another aspect therefore the present invention provides a hybrid audio search engine comprising a phonetic search engine and a large vocabulary search engine wherein the large vocabulary search engine is adapted to operate on portions of spoken audio data identified by the phonetic search engine as likely matches to one or more search terms.

The invention will now be described by way of example only with reference to the following drawings, of which.

Figure 1:
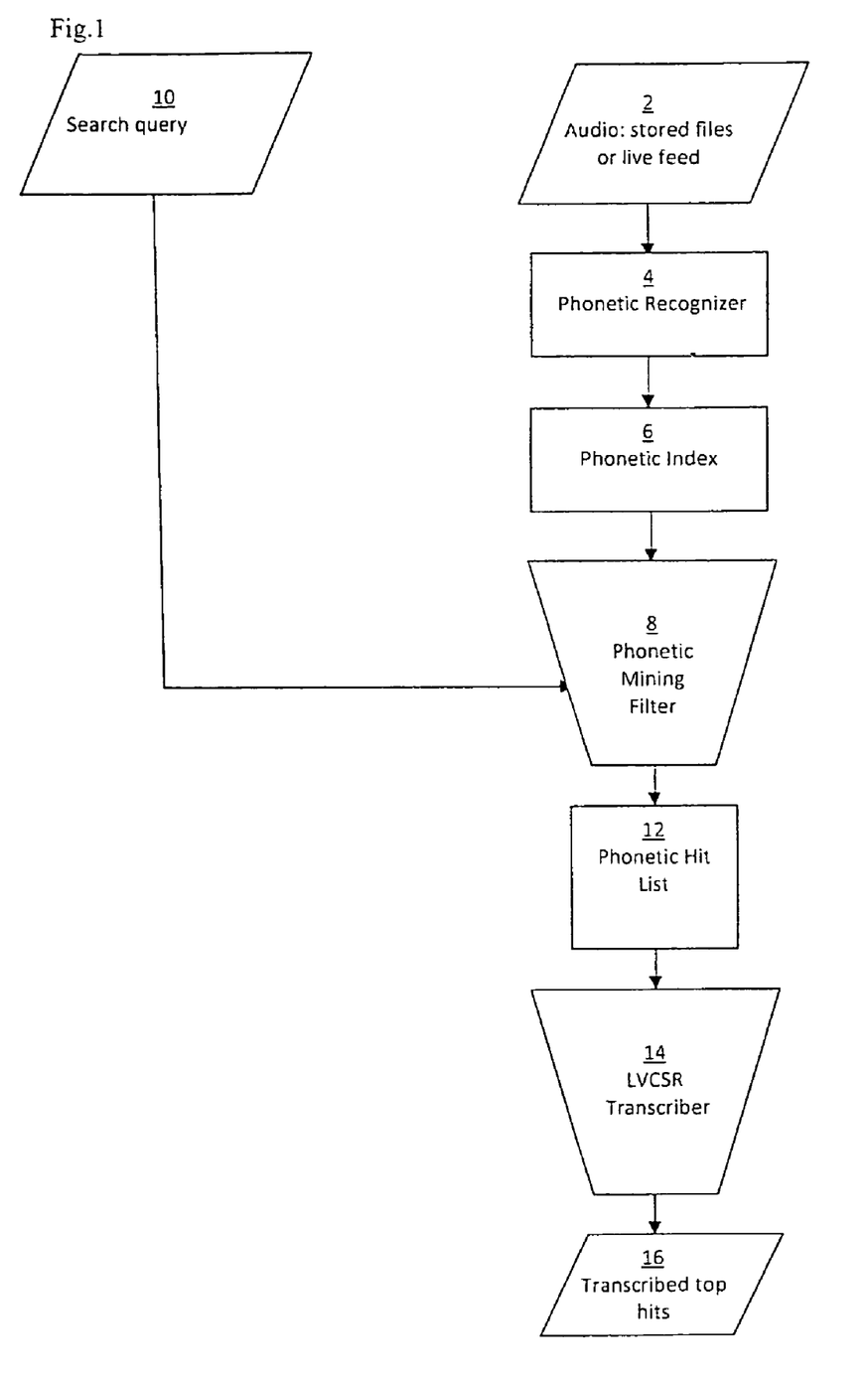
FIG. 1 illustrates the steps performed in a first embodiment of the invention.

Referring to FIG. 1 the steps involved in one method of the invention is described. Spoken audio data 2, which it is wished to search, is obtained. This spoken audio data may be obtained from a number of sources. For instance the spoken audio data could be stored audio data files or multimedia files having an audio component. The spoken audio data could for instance be held in a database or could be obtained from sources such as the internet. Alternatively the spoken audio data could be a live feed, for instance a telephone conversation or radio or television broadcast.

The first stage in the process is to ingest the spoken audio data into the search system. The spoken audio data is passed to a phonetic recogniser 4 which processes the spoken audio to produce a phonetic representation of the spoken audio. The phonetic representation could be a simple phonetic transcript of the phonetic content of the spoken audio or could include multiple hypotheses. For instance the phonetic representation could comprise a phone lattice. In a useful embodiment however the phonetic representation is produced as described in US2006/0206324, the contents of which are hereby incorporated by reference. As described therein the phonetic recogniser 4 is provided with phonetic models which contain model details of a set of reference phones. The reference phones may be all the phones of a particular language or may be a set of phones from a plurality of languages. The phonetic recogniser 4 analyses frames of the audio data 2, typically at a rate of 100 frames per second, and for each frame compares the audio data with the phonetic models. Typically, the models will be hidden Markov models (HMMs) and will contain features related to the spectral content of the sounds they are associated with. One or more HMMs will represent each phone and durational characteristics of the phone are also modelled. The same features are calculated for the audio to allow the recogniser to determine the models that match the audio data most closely. The phonetic recogniser calculates model distances using all of the model features that typically relate to the frequency content of the signal. In some instances phonetic grammar rules may also be used in determining the scores for each phone, i.e. rules to eliminate unlikely phone sequences. In general however information regarding all possible phones is stored and no hard choices are made regarding the sequence of phones and so the distances are generated purely based on how closely the audio matches the model. A score may be stored for each phone for each frame to avoid any loss of data or only the scores for the better matching phones may be stored to reduce data requirements.

The phonetic representation forms a phonetic index 6 which may be stored as a metadata file linked to the audio file. For instance the phonetic index could be created and stored as metadata in a file when audio data is placed in an archive. Thus the processing to create the phonetic index is done once only, ahead of the search time, avoiding the need to perform this step at search time with consequent advantages in terms of speed. Alternatively it is possible to create the phonetic index in real time or faster on an as-needed basis. In this way, for example, one or more searches may be performed on live feeds without the need for additional file storage.

At search time the spoken audio data to be searched is obtained along with the phonetic index (whether pre-stored or created in an initial step). The phonetic index is then searched using a phonetic data miner 8 to effectively filter the phonetic data. The phonetic data miner takes user generated search terms, such as words or phrases, 10 and forms phonetic search queries. The search terms are conveniently entered as text but other ways of inputting query terms are possible. For instance spoken input could be used to capture the search terms or the search terms could be inputted as a phoneme sequence.

The search terms are converted to one or more phonetic search strings based on phonetic dictionaries. More than one search string may be formed based on different possible pronunciations and alternative word forms. Additionally or alternatively letter to sound tables may be used to form the one or more phonetic search strings.

The phonetic data miner can select phonetic indices and/or sections within indices according to additional criteria, such audio source, time, prior search results, or any other forms of metadata that can be efficiently applied. Such criteria may impose an absolute limit on the searched index data and thus reduce overall processing time. The various phonetic search strings and other indicia form an overall search query.

Where the phonetic index comprises a simple matrix of scores as described above a dynamic programming (DP) search module can be used to identify likely occurrences of each phonetic search sequence based on the model distances stored in the phonetic index.

Dynamic programming is a well established technique used in a variety of pattern matching applications. It provides a computationally efficient way to align two sequences of arbitrary length in a way that applies the optimum non-linear timescale distortion to achieve the best match at all points.

The search runs once, working from the start to the end of the index file data in time order storing matches and scores as it progresses. As part of the phonetic search the scores are scaled and thresholded as appropriate.

The DP search module therefore can be used to identify occurrences of each phonetic search string in a phonetic index. The DP also produces a confidence score for each possible match that can be used to rank the results. The phonetic data miner therefore creates an initial results list 12 identifying the possible match in the phonetic index and the score for the possible match, the relevant audio data to which the match relates and the position of the possible match in the audio data.

A portion of the audio data corresponding to each likely match is then selected and processed by a large vocabulary speech recogniser, in this example a LVCSR. In a simple embodiment a window of time of the order of a few seconds is centred on the likely match with the beginning and end of the window located between words as identified by periods of silence. The spoken audio within the time window is then processed using the LVCSR 14 to produce a textual transcript.

Alternatively, starting with the position of the likely match the audio data could be processed forwards by the LVCSR for a certain period of time, say a few seconds, or until a predetermined number of words have been identified. Also starting with the position of the likely match the audio data could be processed backwards for a set period of time or until a set number of words have been transcribed. Processing backwards through time is an unusual way of running a speech recognition system, but the principle and the implementation will be obvious to one skilled in the art.

In processing the audio with the LVCSR the grammar probabilities (used by the LVCSR in deciding on the words represented by the audio) may be modified based on the confidence score generated in the phonetic search to reflect the assumption that the search term is likely to be present in the particular part of the audio.

The ranked, transcribed results are provided as output 16. In the embodiment of FIG. 1 the results are provided to a user through a graphical user interface. The display lists the most relevant hits first and gives an indication of the score for the hit, i.e. the degree of confidence in the match. The transcribed data is also presented, either as the result itself or as part thereof. The display can also give other details about the relevant audio file, for instance any title, data or content details. The display will also give a link to the relevant part of the audio file so that the user can play the relevant part of the audio file (or audio visual file if appropriate). In this way the user can quickly determine through a visual scan whether the hit is indeed relevant to their search and can discount obviously non-relevant hits. For hits of possible interest the user can access the link and proceed to listen to the relevant segment of the audio data.

This embodiment of the present invention therefore simplifies the presentation of the results to the user whilst preserving all the benefits of phonetic searching. Given that a phonetic transcript of the relevant section of the audio for each likely match is produced it is also possible to use this transcript in a further automated processing step.

Figure 2:
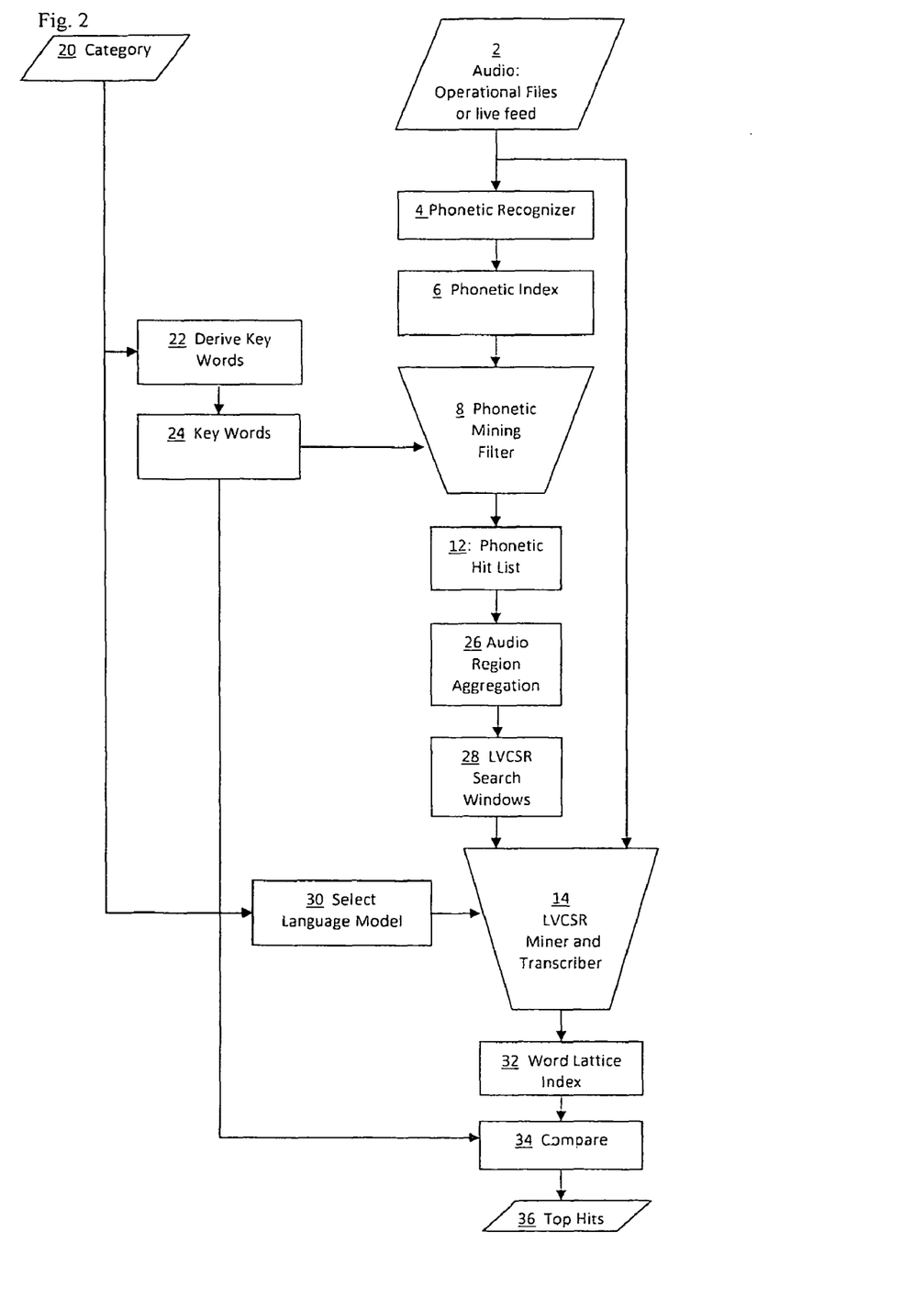
FIG. 2 illustrates the steps involved in a second embodiment of the invention.

In another embodiment of the present invention the results of the LVCSR are used for further processing or refinement of the result list produced by the phonetic data miner which is particularly applicable to automated topic spotting or the like. Referring to FIG. 2 the elements and steps which are the same as described above with reference to FIG. 1 are referenced by the same numerals.

As described above the audio files or live audio feed 2 is ingested by a phonetic recogniser 4 to produce a phonetic index file 6. When a search is initiated this phonetic index file is searched by a phonetic data miner 8 to identify likely matches to the search terms and an initial results list 12 is generated.

For this application however the search terms are determined by the topic of interest. Thus an initial category 20 may be selected from an available list or may be specified by a user. For instance a user may wish to automatically monitor speech broadcast over broadcast media relating to the weather. The category "weather" may therefore be selected or specified.

Topic spotting generally relies on detecting occurrences of key words related to the topic in the data to be searched. A first step 22 is therefore to derive the key words 24 relevant to the topic. For instance for the "weather" topic the key words could include sun, sunshine, rain, showers, precipitation, wet, wind, temperature, hot, cold, warm, fog, mist etc.

These key words 24 are each converted into one or more phonetic search strings as described previously and used for the search by the phonetic data miner. The result list 12 is therefore an indication of likely matches to the search query, which in the general case may be a compound comprising a weighted combination of search terms.

For topic spotting one is generally seeking more than one instance of a keyword occurring in a relatively short space of time. A single instance of the word "rain" does not indicate that a weather report is being broadcast but reference to several key words in a short space of time means that it is more likely.

The phonetic hit list is therefore used to identify segments of the original audio suitable for processing by the LVCSR. This step may involve aggregating several hits within an acceptance window according to logic and/or statistical techniques. The aggregated regions are used to identify search windows 28 for the LVCSR 14.

The LVCSR 14 then processes the audio in the search windows using a language model 30 appropriate to the topic of interest. The language model defines the vocabulary and word sequence probabilities that the recogniser uses to transcribe speech or spot words. The use of topic-specific vocabularies means that all the key topic-specific words are included, as well as take into account the speech patterns likely to be encountered. A language model can be compiled from a statistical analysis of representative on-topic speech data. For example a language model for weather forecasts could be trained from transcripts of weather reports from archives of radio station broadcasts, or text from newspaper weather forecasts. It is not essential to employ a topic-specific language model; if an appropriate topic-specific language model did not exist, a language model trained on general speech may be applied.

The LVCSR then processes the identified search windows to produce a word lattice index 32. The skilled person will understand that a word lattice contains an indication of the most likely words that the spoken audio corresponds to along with the most likely alternatives. This word lattice may then be compared 34 with the key words 24, and the hits ranked according to the confidence of occurrence of the one or more detected key words. It should be noted that the key words used for the phonetic search and those used for processing the LVCSR data need not be the same and there may be some advantage in using at least some different key words for each search. In either case the confidence scores generated by the LVCSR processing could be used to form the ranked hit list on their own or the scores from both the phonetic search and the LVCSR processing could be combined to give a combined score. The ranked list of hits 36 and associated transcription and metadata is then output for further automated processing or displayed to the user on a graphical user interface.

This method of the present invention therefore eliminates some of the false positives that can be identified using a phonetic search engine alone and provides a more robust search, but whilst maintaining the advantages of speed and flexibility of a phonetic search engine. As described above presenting a transcription of a portion of the audio data also allows a quick visual inspection of the relevance of the hits without requiring a user to listen to each and every possible match to judge its relevance. Similarly the data reduction and information extraction afforded by the present invention reduces processing requirements and may improve the accuracy of subsequent automated analysis.

The skilled person will, of course, be aware that numerous modifications and changes to the invention as described as are possible depending on how the invention is used and will appreciate it is not desired to limit the invention to the exact construction and operation illustrated and described, and accordingly all suitable modifications and equivalents may be resorted to, falling within the scope of the invention.

The invention claimed is:

1. A method of searching spoken audio data for a search term, said method comprising the steps of:
    taking phonetic index data corresponding to the spoken audio data,
    searching the phonetic index data for likely matches to the search term,
    selecting a portion of the spoken audio data when a likely match is detected and,
    processing said selected portion of the spoken audio data for producing textual data, wherein said searching and selecting steps are implemented on a phonetic audio searcher and said processing step is implemented on a large vocabulary speech recogniser.

2. A method as claimed in claim 1 wherein the phonetic index data comprises a score for some or all of a set of reference phones for each frame time of the spoken audio data.

3. A method as claimed in claim 1 further comprising a step of processing the spoken audio data to create phonetic index data.

4. A method as claimed in claim 2 wherein the step of searching the phonetic index data for likely matches to the search term comprises a dynamic programming search.

5. A method as claimed in claim 1 wherein the output of the large vocabulary speech recogniser comprises a confidence level for the likely match.

6. A method as claimed in claim 1 wherein the output of the large vocabulary speech recogniser comprises an indication of likely possible words corresponding to the selected portion of the spoken audio data or phonetic index data.

7. A method according to claim 1 wherein the output of the large vocabulary speech recogniser comprises a textual transcript of the selected portion of the spoken audio data or phonetic index data.

8. A method as claimed in claim 7 further comprising the step of displaying the textual transcript of the portion of the spoken audio data or phonetic index file corresponding to the likely match to the search term to a user.

9. A method as claimed in claim 1 further comprising the step of using automated analysis on the large vocabulary speech recogniser output.

10. A method as claimed in claim 1 wherein said selected portion of the spoken audio or phonetic index data which includes the likely match also includes periods of any spoken audio immediately before and after the likely match.

11. A method as claimed in claim 1 wherein said selected portion of the spoken audio or phonetic index data which includes the likely match and any periods of any spoken audio immediately before and after the likely match is determined by the large vocabulary speech recogniser.

12. A method according to claim 1 further comprising the step of extending the vocabulary of the large vocabulary speech recogniser to include all words in the search term.

13. A method as claimed in claim 1 wherein further processing is performed on the output of the large vocabulary speech recogniser.

14. A method as claimed in claim 13 wherein the output of the large vocabulary speech recogniser is searched for the or each search term to derive a confidence level for each possible match.

15. A method as claimed in claim 14 wherein the confidence level for each possible match combines a confidence measure from the search of the phonetic index data with a confidence measure from the large vocabulary speech recogniser.

16. A method as claimed in claim 13 wherein the further processing comprises searching for a search query comprising one or more search terms and outputting a confidence level for a match to the query as a whole.

17. A method as claimed in claim 13 wherein the further processing of the output of the large vocabulary speech recogniser comprises searching for at least one additional search term not used in the search of the phonetic index data.

18. A method as claimed in claim 13 wherein, after performing the further processing of the output of the large vocabulary speech recogniser, a textual transcription of the portion of the spoken audio data corresponding to the likely match is produced.

19. A method as claimed in claim 1 wherein the likelihood of match determined in the search of the phonetic index data is used in processing said selected portion of spoken audio data or phonetic index file with said large vocabulary speech recogniser.

20. A method of searching spoken audio data for one or more search terms comprising the steps of:
    performing a phonetic search of the audio data to identify likely matches to a search term: and
    producing textual data corresponding to a portion of the spoken audio data including a likely match, wherein said performing step is performed on a phonetic audio searcher and said producing step is performed on a large vocabulary speech recogniser.

21. A method as claimed in claim 20 wherein the textual data comprises a textual transcript.

22. A hybrid audio search engine comprising:
    a phonetic search engine for identifying portions of spoken audio data as likely matches to one or more search terms; and
    a large vocabulary search engine, wherein the large vocabulary search engine is configured to operate on said portions of spoken audio data.

* * * * *